United States Patent [19]

Troy

[11] Patent Number: 4,513,403

[45] Date of Patent: Apr. 23, 1985

[54] DATA ENCODING AND SYNCHRONIZATION FOR PULSE TELEMETRY

[75] Inventor: George W. Troy, Citrus Heights, Calif.

[73] Assignee: Exploration Logging, Inc., Sacramento, Calif.

[21] Appl. No.: 405,063

[22] Filed: Aug. 4, 1982

[51] Int. Cl.[3] .......................... G01V 1/40; H04J 7/00; G11B 5/09

[52] U.S. Cl. .......................................... 367/83; 33/307; 181/103; 181/107

[58] Field of Search ................................... 367/81-85, 367/911; 181/102, 103, 107; 340/320, 861; 455/40; 33/307; 375/23; 370/10

[56] References Cited

U.S. PATENT DOCUMENTS

| | | | |
|---|---|---|---|
| Re. 27,810 | 11/1973 | Buehrle | 375/23 |
| 2,759,143 | 2/1956 | Arps | 367/83 |
| 3,863,203 | 1/1975 | Patton et al. | 340/861 |
| 3,908,453 | 9/1975 | Jeter | 367/81 |
| 4,001,775 | 8/1977 | Sextan | 367/83 |
| 4,027,282 | 5/1977 | Jeter | 367/85 |
| 4,131,761 | 12/1978 | Guisto | 375/17 |
| 4,215,425 | 7/1980 | Waggener et al. | 367/83 |
| 4,351,037 | 9/1982 | Schenbotskoy | 375/23 |
| 4,357,634 | 11/1982 | Chung | 375/23 |
| 4,386,422 | 5/1983 | Mumby et al. | 367/83 |
| 4,390,975 | 7/1983 | Shawhan | 181/103 |

OTHER PUBLICATIONS

Bell, "Pulse Time Modulation", 12/44, pp. 21-24, Radio.

McDonald et al., "Borehole Telemetry . . . Measurements", 9/15/75, pp. 111-118, Oil & Gas Journal.

Fogarty, "Digital Communication Systems", 7/23/71, pp. 409-411, vol. M Summer Conference.

*Primary Examiner*—Nelson Moskowitz

*Attorney, Agent, or Firm*—Christie, Parker & Hale

[57] ABSTRACT

A method and apparatus for encoding and synchronizing and sequencing pulse encoded data in a pulse telemetry system. The time intervals between successive pulses in a pulse train are representative of the magnitude of the data parameters. Redundant pulses are included in the pulse trains at predetermined time locations with respect to the pulses so as to enhance the ability to recognize or distinguish data pulses over noise signals. Synchronization pulses are employed to enable identification of the particular data parameters even though one or more of the data pulses is obscured by noise. The sequence of the production of the pulse code signals is continuously monitored to enable the telemetering system to be activated promptly after a shutdown at the place in the train of data where it would be if the shutdown had not occurred.

19 Claims, 13 Drawing Figures

DATA ENCODING AND SYNCHRONIZATION FOR PULSE TELEMETRY

FIELD OF THE INVENTION

This invention relates to methods and means for encoding and synchronizing data in pulse telemetry systems. The invention is particularly suitable for use in processing data acquired at the bottom of a well while the well is being drilled.

THE PRIOR ART

Data acquired at the bottom of a well while the well is being drilled may be transmitted to the surface for processing by pressure or acoustic signals transmitted through the drilling fluid. U.S. Pat. Nos. 2,924,432 to Arps, et al; 3,789,355 to Patton; 3,949,354 to Claycomb; 3,964,556 to Gearhart, et al.; and 3,983,948 to Jeter illustrate various arrangements for transmitting such data to the surface through the drilling fluid. Usually the data is encoded and transmitted in the form of either positive or negative pressure pulses through the drilling fluid.

Noise signals produced by the drilling equipment and drilling process tend to obscure some of the data pulses in the prior art encoding arrangements, and when part of the data pulses are lost it is difficult to determine the particular parameters that are being measured due to the normal variation in the pulse transmission sequence.

In addition, the prior art encoding arrangements require a substantial amount of time to restart logging the well after a shutdown.

SUMMARY OF THE INVENTION

The aforesaid difficulties are overcome in the present invention by the use of a pulse code wherein the time intervals between successive pulses in a pulse train are representative of the magnitude of the data parameters and provide measures of the data parameters, and by including redundant pulses at predetermined locations in the series of encoded data pulses so as to enhance the ability to recognize or distinguish data pulses over noise signals. The pattern of the redundant pulses with respect to the data pulses is such that they have a low probability of being generated by random noise. In addition, synchronization pulses are employed at the beginning of each predefined unit of data information to enable the identification of the particular parameters being telemetered to the surface even though one or more of the pulse code signals that provide a measure of a parameter is obscured by noise.

The sequence of the production of the pulse code signals is continuously monitored to enable the telemetering system to be activated promptly after a shutdown at the place in the train of data where it would be if the shutdown had not occurred.

The encoding, synchronization and sequencing can be provided by programming a microprocessor or by hardware.

DESCRIPTION OF THE PREFERRED EMBODIMENTS

Figure 1:
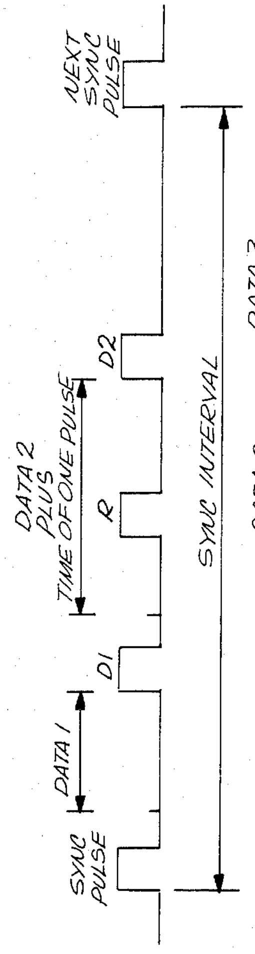
FIG. 1 illustrates one form of the pulse code employing redundant pulses.

A pulse may be defined as a predefined sequence of changes of state (e.g., pressure, voltage) within a fixed period of time. In practice, a pulse may be a drop in pressure followed by a return [increase] to normal pressure, with normal pressure being the pressure within the circulating system for the drilling fluid without the pulse. Negative pressure pulses are preferred, but the encoding scheme is equally applicable to positive pressure pulses.

In the illustrations herein the duration of a pulse is considered to be a drop in pressure for a fixed period of time (e.g. 1 second or 0.5 second) followed by one second of normal pressure.

The measurement of the various parameters in the well, such as gamma ray, formation resistivity, magnetometer, temperature etc., is in analog form. The time intervals between successive data pulses in a pulse train provides the analog measurement of the respectve parameters.

A "frame" is defined to be the period in time required to transmit one complete set of data. In order to maintain synchronization within the frame, the data is ordered into "sub-frames". Each sub-frame is one "synchronization interval" long, and the start position is marked by a synchronization pulse.

Table 1 illustrates a scheme which employs 15 sub-frames. Two "DATA WORDS" are transmitted during each sub-frame except for sub-frame 15 where one data word is transmitted along with a test pattern and "FRAME IDENTIFICATION" pulses. A data word is defined to be the equivalent of an 8-bit binary number (i.e. an integer in the range 0 to 255). The frame identification pulses (or "frame synchronization" pulses) enable identification of the first sub-frame, and hence, enable the pulse detector/decoder at the surface to identify the sequence of data transmission.

TABLE 1

| Sub-Frame | Data Word #1 | Data Word #2 |
|---|---|---|
| 1 | Gamma Ray | Time of Day |
| 2 | Gamma Ray | Mud Temperature |
| 3 | Gamma Ray | Mud Resistivity |
| 4 | Gamma Ray | Battery 1 |
| 5 | Gamma Ray | Battery 2 |
| 6 | Gamma Ray | Battery 3 |
| 7 | Gamma Ray | Battery 4 |

TABLE 1-continued

| Sub-Frame | Data Word #1 | Data Word #2 |
|---|---|---|
| 8 | Gamma Ray | Pressure 1 |
| 9 | Gamma Ray | Pressure 2 |
| 10 | Gamma Ray | Pulse Pressure |
| 11 | Gamma Ray | Pressure Variation |
| 12 | Gamma Ray | Borehole Inclination |
| 13 | Gamma Ray | Hydrostatic Pressure 1 |
| 14 | Gamma Ray | Hydrostatic Pressure 2 |
| 15 | Gamma Ray | Test + Frame Identification Patterns |

Table 2 illustrates a scheme which employs 11 sub-frames and three data words in each sub-frame.

TABLE 2

| Sub-Frame # | Data 1 | Data 2 | Data 3 |
|---|---|---|---|
| | | Conventional Data | |
| 1 | Gamma Ray | Formation Resistivity | Frame Ident Pattern |
| 2 | Gamma Ray | Formation Resistivity | Formation Resistivity |
| 3 | Gamma Ray | Formation Resistivity | Mud Resistivity |
| 4 | Gamma Ray | Formation Resistivity | Formation Resistivity |
| 5 | Gamma Ray | Formation Resistivity | Mud Temperature |
| 6 | Gamma Ray | Formation Resistivity | Formation Resistivity |
| | | Directional Data | |
| 1 | Survey Temp | Survey Accuracy | Frame Ident Pattern |
| 2 | Accelerometer X | Accelerometer Y | Accelerometer X |
| 3 | Accelerometer Y | Magnetometer X | Magnetometer Y |
| 4 | Magnetometer Z | Mag X + Mag Z | May Y + Mag Z |
| | | Test Pattern | |
| 1 | Space available for test pattern | | Frame Ident Pattern |

When the last sub-frame is completed, transmission resumes at sub-frame 1 with no relay, with the sync pulse for sub-frame 1 being one synchronization interval after the sync pulse for the last sub-frame (i.e. sub-frame 15 in Table 1).

After synchronization has been attained (the sync pulses are recognized as the only pulses invariant over one sync interval and the sub-frame numbers can be decoded after the frame identification pulses are recognized), the surface detector/decoder can assume (interpolate) the position of the following sync and identification pulses and only the data pulses need to be detected in order to correctly decode all data. Synchronization is maintained during periods where no data pulses are transmitted, and hence it is possible to restart decoding data immediately after a connection without any resynchronization delays.

In practice, the surface detector/decoder continuously attempts to search for sync and identification pulses to accommodate any small drift in the timing clocks of the downhole and surface equipment.

A sub-frame has been defined as an interval in time of duration one sync interval started by a sync pulse. In order to transmit two data words per sync interval, two additional pulses are required. The time from the end of the sync pulse to the first (data) pulse is proportional to the data word (#1) being transmitted Time 1=Data 1 * dT Where dT=The time for one unit of transmitted data Data 1=Number of transmission units (Data value in range 0–255)

In a similar fashion, the time from the end of the first data pulse to the second data pulse is proportional to the second data word (#2).

The information necessary to discriminate between data pulses and noise pulses is supplied by generating a pattern of pulses which have a low probability of being generated by random noise. This requires additional pulses to create the patterns.

FIG. 1 illustrates a pulse scheme which is suitable for transmission of the data in Table 1. Each sub-frame has two data words, and the analog measures of the data parameters comprises the time between the sync pulses and D1 and the time between D1 and D2.

A "redundant pulse" R is provided midway between adjacent pairs of data pulses. It is employed to discriminate between time data pulses and noise pulses. Thus, any two data pulses can be considered to be data pulses (D1 and D2) only if there exists one additional pulse (R) midway in time between the data pulses.

The timing of scheme of FIG. 1 may be as follows:

The duration of a pulse is two seconds. (A one-second drop in pressure followed by one second of normal pressure.)

| | |
|---|---|
| One Unit of Time (dT) | = 3/32 seconds |
| Full-Scale Data Word | = 255 * 3/32 = 23.9 seconds |
| Maximum Data Transmission Time | = 2 full-scale data words + 4 pulses |
| | = 55.8 seconds |
| Sync Interval | = 60 seconds |

(The sync interval could have been selected as 55.8 seconds. Sixty seconds was chosen as a convenient interval for testing.)

Although the encoding scheme deals with the equivalent of 8-bit (binary) numbers, this does not limit the system to the transmission of two "pieces of information" per sub-frame. When the (analog) number is decoded on-surface, it is a simple matter, using a digital computer, to recreate the 8 individual (binary) bits of information that were transmitted by the downhole Tool. Thus we are, in essence, transmitting 16 independent pieces of information each sub-frame (2 8-bit words).

Figure 11:
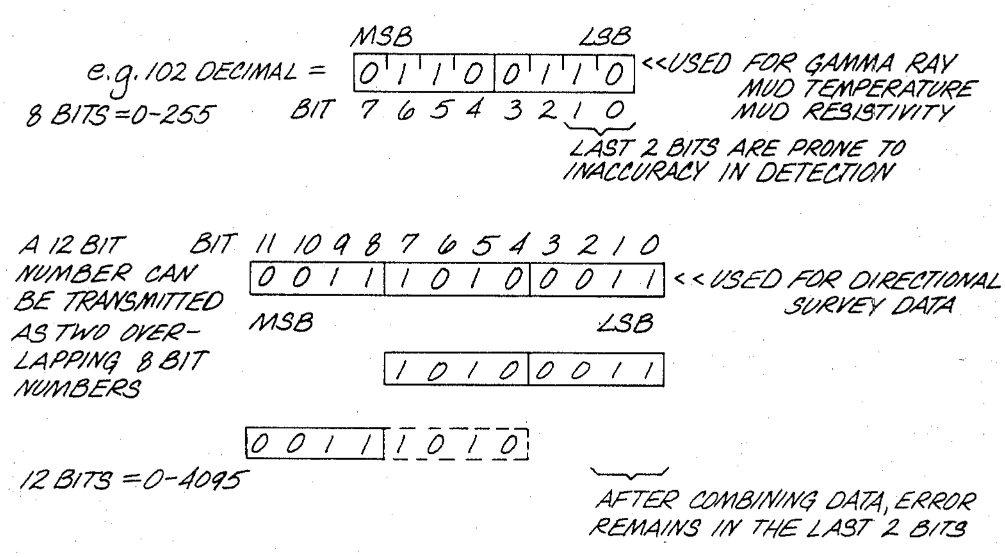
FIG. 11 shows how the data is represented as eight bit binary numbers.

This concept is used in the transmission of the pressure information in sub-frames 8/9 and 13/14 of Table 1. The downhole sensors are measured using a 12-bit ADC. Although the additional accuracy obtainable using a 12-bit number (1/4096 compared to 1/256 for an 8-bit number) is not necessary for all sensors, it is necessary to resolve bottomhole pressures (several thousand psi) to a few psi. The measured 12-bit number was transmitted as two 8-bit numbers with a 4-bit overlap as shown below:

All transmitted mud pulse data is represented (downhole) as eight bit binary numbers, as illustrated in FIG. 11.

"Pressure 1" is the most significant 8 bits of the raw 12-bit data and "Pressure 2" is the least significant 8 bits of the raw 12-bit data. Since the data words are transmitted using an analog scheme, the probability of correctly decoding the individual data bits is greatest for the most significant bits. (If there is an error in decoding due to the inability to resolve the data pulses to the required interval [approximately 0.1 second], then a small error will be introduced—the number 211 may be decoded as 212, for example.)

Figure 2:
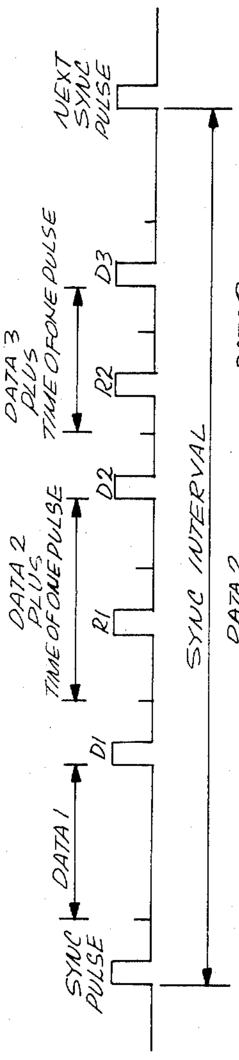
FIGS. 2–4 illustrate alternate pulse codes employing redundant pulses.

FIG. 2 illustrates a pulse scheme which is suitable for transmission of the data in Table 2.

The duration of one pulse is reduced to a half-second drop in pressure followed by one second at normal pressure. The time for one unit of data (dT) was reduced to 1/16 second. Instead of reducing the sync interval, a third (8-bit) data word is transmitted in the interval following the second data word. One additional redundant pulse was required between the second and third data pulses to ensure identification of the third data pulse.

The timing is as follows:

| | |
|---|---|
| One pulse | = 1.5 seconds (0.5 sec drop + 1 sec normal) |
| One Unit of Time (dT) | = 1/16 seconds |
| One Full-Scale Data Word | = 255 * 1/16 = 15.9 seconds |
| Maximum Data Transmission Time | = 3 full-scale data words + 6 pulses = 56.8 seconds |
| Sync Interval | = 60 seconds |

Figure 3:
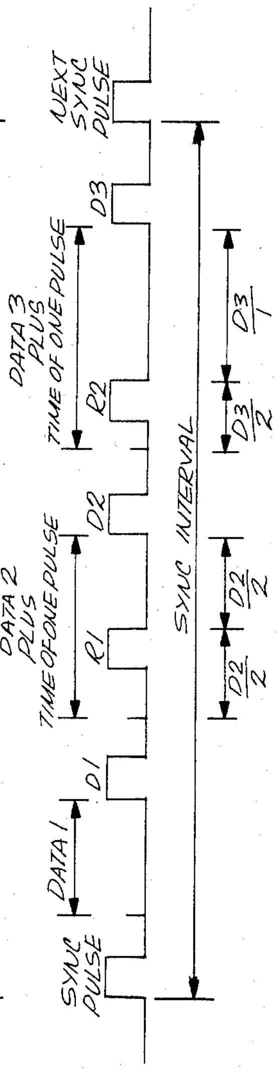

FIG. 3 illustrates a pulse scheme which is similar to that of FIG. 2, with the redundant pulses R1 midway in time between the adjacent data pulses D1 and D2, but with redundant pulses R2 not midway in time between the adjacent data pulses D2 and D3. Rather, the pulses R2 can be spaced any desired time ratio between the adjacent data pulses. Such an encoding scheme is asymmetrical in time and is advantageous when multiple "groups of three" (2 data+1 redundant) pulses appear within one sub-frame. If desired, both of the redundant pulses R1 and R2 may be asymmetrical in time with respect to the adjacent data pulses.

Although the encoding scheme of FIG. 2 has been selected to fit three full-scale data words per sub-frame, the data is normally not full-scale and there is therefore "unused" time at the end of most sub-frames during which additional data can be transmitted. The encoding scheme can be set up to transmit additional data if time is available. This will change the data rate from the current fixed value of three (8-bit) words per minute to an average data rate which will not be less than the current rate.

Although the encoding scheme of FIG. 2 requires two pulses (e.g. R2 and D3) for the addition of one data word, it is possible to use a redundant pulse after every second data pulse or between alternate pairs of data pulses and maintain a check on all data.

Figure 4:
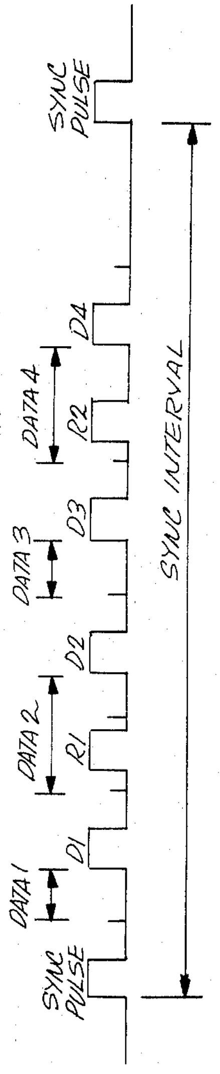

FIG. 4 illustrates such an encoding scheme which increases the total number of words transmitted within a sub-frame by the use of a redundant pulse between alternate pairs of data pulses.

The maximum data rate is limited by the pulse width. Consider the following example:

Pulse Width=1.5 seconds

Sync Interval=60 seconds

A maximum of 40 pulses could be transmitted.

At three pulses per pair of data words, this could be interpreted as 13 pairs of (zero valued) data words, i.e., 26 data words per minute.

Another example considers average data values. For 8-bit data words, the full-scale data value is 255, the average is therefore 127.5. At 1/16 seconds per data unit this corresponds to 8 seconds per data word.

Total Time=Sync Pulse Time+n*(8 sec+1.5 pulses data word)

60 seconds=1.5 seconds+n*(9.5 seconds)

therefore, n=6.2 where n is the number of data words

Although a downhole Tool is not expected to produce random data, most sensors (gamma ray and formation resistivity) are scaled such that common sensor readings are approximately mid range to accommodate unusually high measurements as well as unusually low measurements. Hence, data will tend to supply average valued data in "typical" formations.

Figure 5:
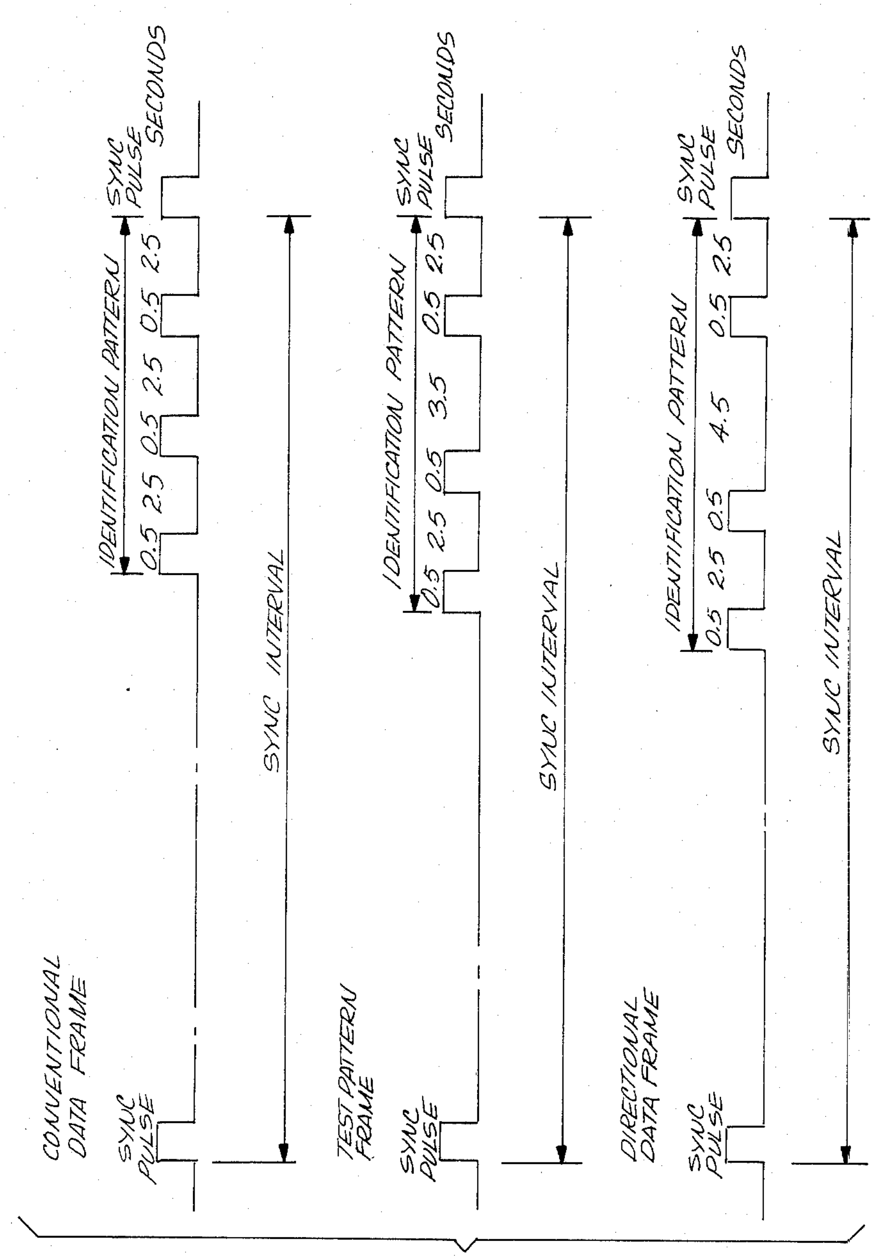
FIG. 5 illustrates three types of identification patterns that may be incorporated into the pulse codes.

As illustrated in FIG. 5, the frame structure may be extended to accommodate different data types. Three different frames may be transmitted. Conventional Frames, Directional Frames and Test Pattern Frames. Each frame has a predetermined number of sub-frames. The frame ident patterns are transmitted at the end of the first sub-frame of each frame.

With the pulse encoding scheme of FIG. 2, whenever a frame identification pattern is transmitted, only two data words are included in the sub-frame to ensure that there is no overlap between the frame ident pattern and the third data pulse. Part of the frame ident pattern is transmitted in the period between the full-scale data time of 56.8 seconds and the end of the sub-frame. This helps with the identification of the frame pattern since data pulses are never transmitted in this period.

The programming schemes of FIGS. 1-5 may be produced by programming a suitable microprocessor, such as the RCA 1802, or by circuit hardware.

Figure 6:
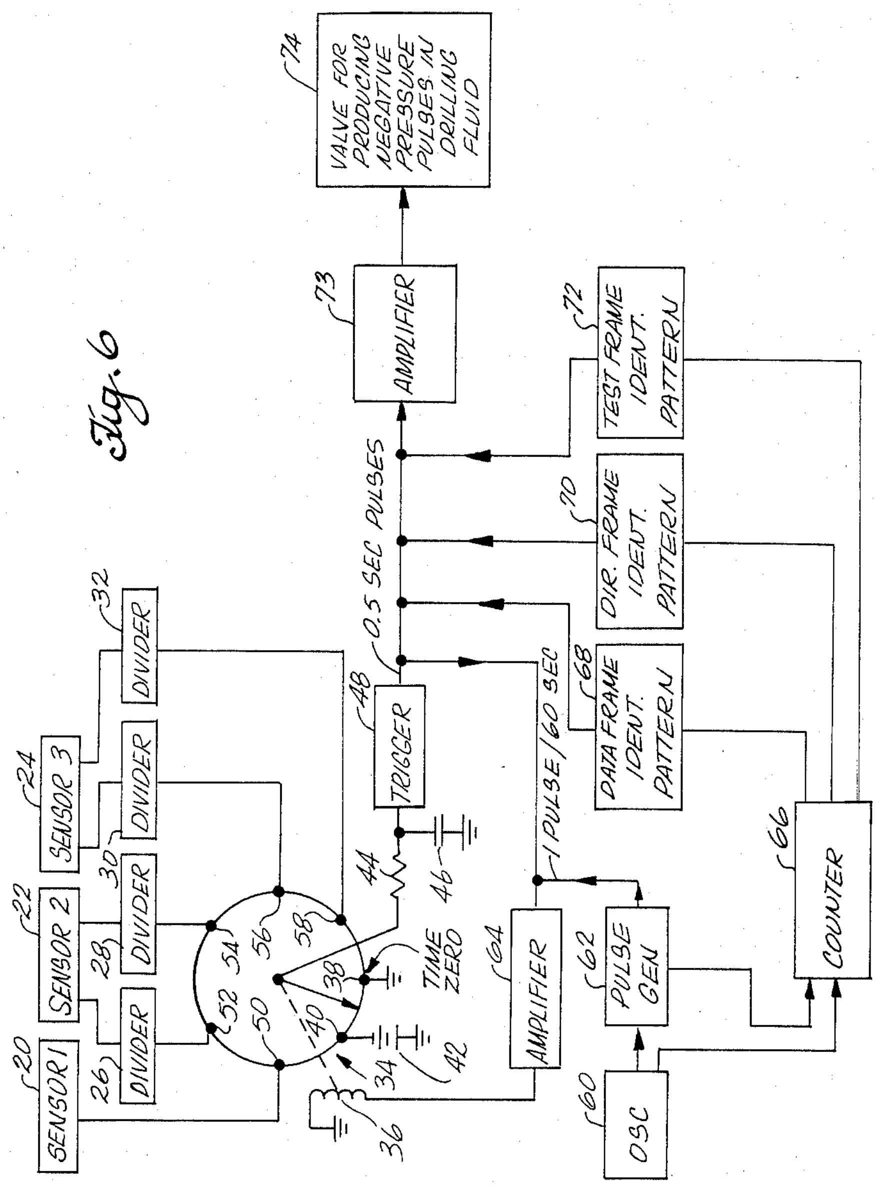
FIG. 6 shows how the pulse code signals may be produced by circuit hardware and employed to produce negative pressure pulses in drilling fluid.

FIG. 6 illustrates a way of producing the encoding schemes with electric current hardware. The illustration is directed to the pulse scheme of FIG. 2, and it will be apparent that the circuit may be modified to produce any of the pulse schemes that have been discussed above. The measurement of only three data parameters for one sub-frame is illustrated for simplicity. It will be apparent that additional data parameters may be measured in the system for the selected number of sub-frames.

The data to be transmitted to the surface is measured in analog form, such as voltage, by the sensors 20, 22, and 24. The voltages that are produced by sensors 22 and 24 are divided by dividers 26, 28, 30 and 32 for use in producing the redundant pulses R1 and R2.

The voltages so produced are scanned by a stepping switch 34 which is actuated by a coil 36. A terminal 38 of the switch is grounded and it represents time zero in each sub-frame. A terminal 40 of the switch is connected to a battery 42 which provides the synchronizing pulses.

The rotor of the stepping switch 34 is connected to a resistor-condenser network 44, 46 which is connected to a trigger circuit 48. The time constant of the resistor-condenser network 44, 46 causes the trigger to produce pulses of 0.5 second duration at times that are representative of the voltages produced by the respective sensors. Thus, the time spacing between the data pulses that are produced at the output of the trigger 48 is an analog representation of the magnitude of the data as measured by the sensors 20, 22 and 24.

If the redundant pulses R1 and R2 are to be equally spaced in time between the adjacent data pulses, the dividers 26, 28, 30 and 32 divide the voltages that are produced by the sensors 22 and 24 by two.

The rotor of the stepping switch 34 is on terminal 38 at time zero. Upon actuation, the rotor moves to terminal 40 which carries a voltage which immediately actuates the trigger 48 to produce a sync pulse. Upon further actuation, the rotor scans terminal 50 and the trigger 48 produces data pulse D1. Thereafter it engages terminal 52 and the trigger 48 produces redundant pulse R1. Next it engages terminal 54 to produce data pulse D2. Redundant pulse R2 and data pulse D2 are produced when the rotor scans terminals 56 and 58.

The coil 36 of the stepping switch is first energized by a pulse produced by the oscillator 60 and pulse generator 62 which produce one pulse each sixty seconds which are applied through an amplifier 64 to the coil 36. Thereafter during one sync interval the coil 36 is energized in steps by the pulses that are produced by the trigger 48.

A counter 66 is connected to the oscillator 60 and the pulse generator 62. It serves to activate data frame identification pattern generator 68, directional frame identification pattern generator 70, and test frame identification pattern generator 72 at the times that those frames are to be inserted into the pulse scheme of Table 2.

The data pulses and redundant pulses and the frame identification patterns are applied through an amplifier 73 to a valve 74 to cause it to open and produce negative pressure pulses in the drilling fluid in response to each of the pulses.

Various types of valves 74 may be employed. A suitable valve 74 is disclosed in application Ser. No. 190,636 which was filed on Sept. 25, 1980 by Mumby, et al. A suitable control circuit for actuating such a valve is disclosed in application Ser. No. 169,763 filed on Dec. 7, 1981 by Wisniewski, et al.

Figure 7:
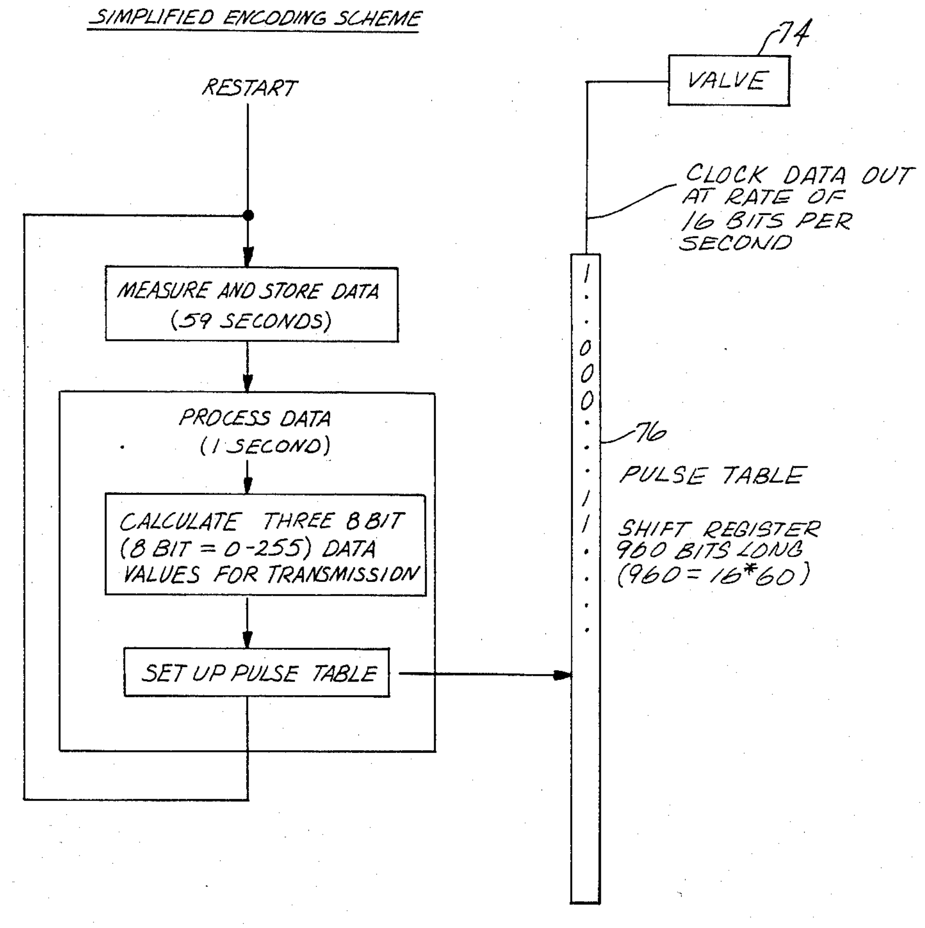
FIGS. 7 and 8 illustrate how the analog parameters may be converted to binary signals under the control of a microprocessor so as to produce the pulse codes.
Figure 8:
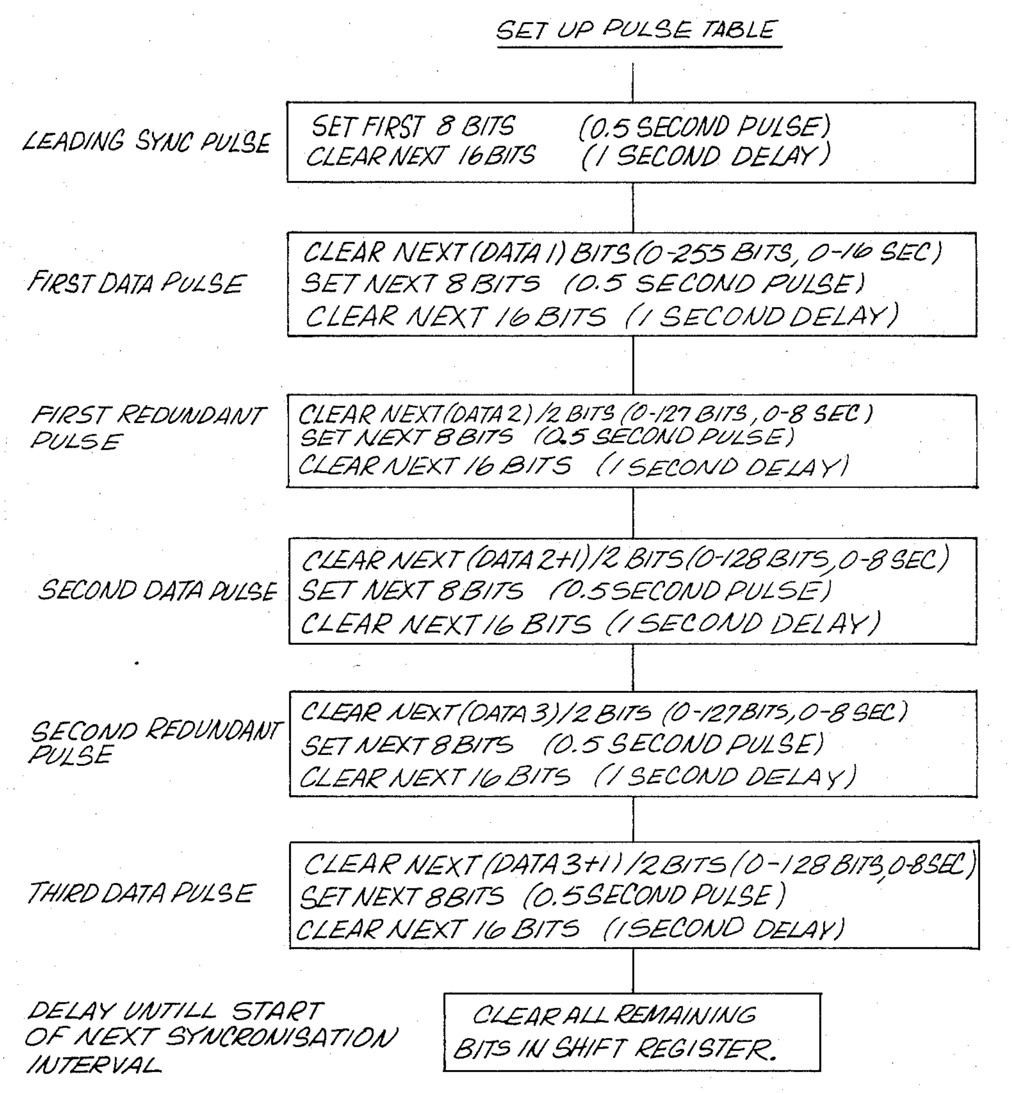

A valve for producing positive pulses is disclosed by application Ser. No. 355,921 filed on Mar. 8, 1982 by Mumby. FIGS. 7 and 8 show how the analog pulses may be produced under the control of a microprocessor, such as the RCA 1802.

Figure 12:
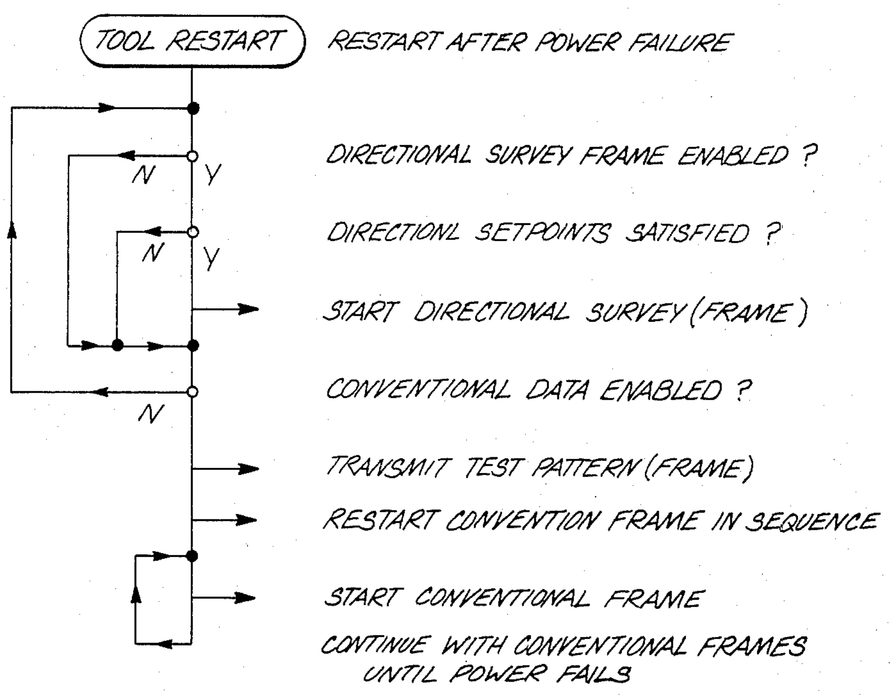
FIG. 12 illustrates the order of transmission of different frame types of data.

The order of transmission of the different frame types is variable and is set up within the microprocessor which operates the downhole Tool. The sequence is best shown by a flow diagram, as illustrated in FIG. 12.

FIG. 7 is a simplified block diagram showing the method of setting up pulse timing in response to the encoding scheme of FIG. 2. Three data words are transmitted in one synchronization interval. The synchronization interval is 60 seconds.

When the Tool restarts it measures data for 59 seconds. In the following second the three data words (8-bit numbers=integers in the range 0-255) are calculated and the pulse table is set up for the next minute.

The pulse table is a shift register 76 (960 bits long) which is clocked out at a rate of 16 bits per second. It takes exactly one synchronization interval (60 seconds) to clock out all data.

The data from the shift register 76 controls the pulsing valve 74. While a "one" is present at the output from the shift register the pulsing valve 74 will remain open and a pulse will be transmitted.

During the first minute of Tool operation after a restart there is no data to transmit. However, after the first minute, data is transmitted (clocked out of the shift register) at the same time that new data is being measured.

The sequence to SET UP PULSE TABLE involves setting a string of "ones" into the Pulse Table Shift Register 76 to transmit a pulse, and "zeroes" to mark the time between pulses, as shown in FIG. 8. Since the bits are clocked out of the shift register at the rate of 16 per second, a sequence of 8 "ones" is required to generate a one-half second pulse.

Since there are no redundant pulses between the sync pulse and the first data pulse the number of zeroes required for Data1 is equal to the value of the data (0–255). The remaining two data words are "split in half" by the redundant pulses. In the case of Data2, the number of "zeroes" corresponding the first half, (Data2)/2 rounded down to the nearest integer, is set up prior to the first redundant pulse. The second half, (Data2+1)/2 rounded down to the nearest integer, is set up after the redundant pulse, before the second data pulse.

The extra "+1" is required in the second "half" since 2 does not divide an odd number exactly. Consider the two examples:

| |
|---|
| Transmitted Data = 122, |
| (Data)/2 – 61.0, (Data+1)/2 = 61.5 rounded to 61 |
| Decoded data = 61+61 = 122. |
| Transmitted Data = 123 |
| (Data)/2 = 61.5 rounded to 61.0, (Data+1)/2 = 62 |
| Decoded data = 61+62 = 123. |

A similar procedure is used to set up Data 3.

Figure 9:
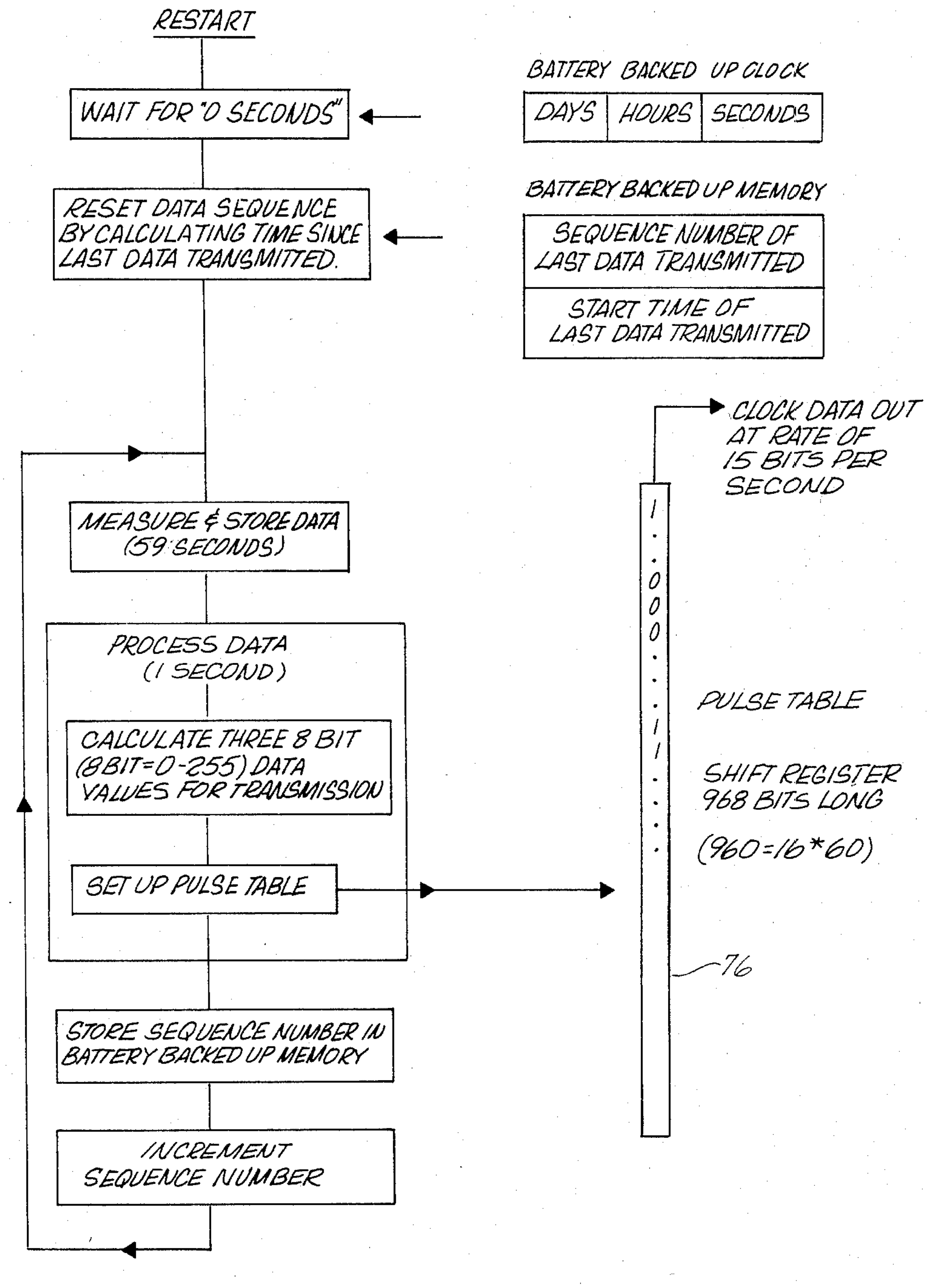
FIG. 9 illustrates how a synchronized restart may be incorporated into the encoding scheme so that the system may be activated promptly after a shutdown at the place in the train of data where it would be if the shutdown had not occurred.

FIG. 9 shows the changes to the scheme that are required to ensure that data starts up in synchronization with the data transmitted before the restart.

Two pieces of hardware are required to enable the synchronized restart. The first is a battery backed up clock. This enables the Tool to "wait" until a new synchronization interval starts (once per minute, every time "seconds" reads zero) before restarting the measurement/transmit sequence. The second is a battery backed up memory register. Every time new pulse data is set into the pulse table shift register the time and sequence number (sub-frame number) are stored in battery backed up memory registers. If the Tool is shut down and then restarted this data is saved and can be inspected. The Tool can therefore restart at the point in its predefined sequence where it would have been if it had not shut down.

The predefined sequence (or Frame) defines which data to measure and transmit—different sensors may be measured each minute (each synchronization interval).

The surface (decoding) equipment always assumes that the downhole Tool transmits its data in the order of the predefined sequence and therefore does not need to resynchronize with the downhole Tool every time the downhole Tool restarts (every connection).

Figure 10:
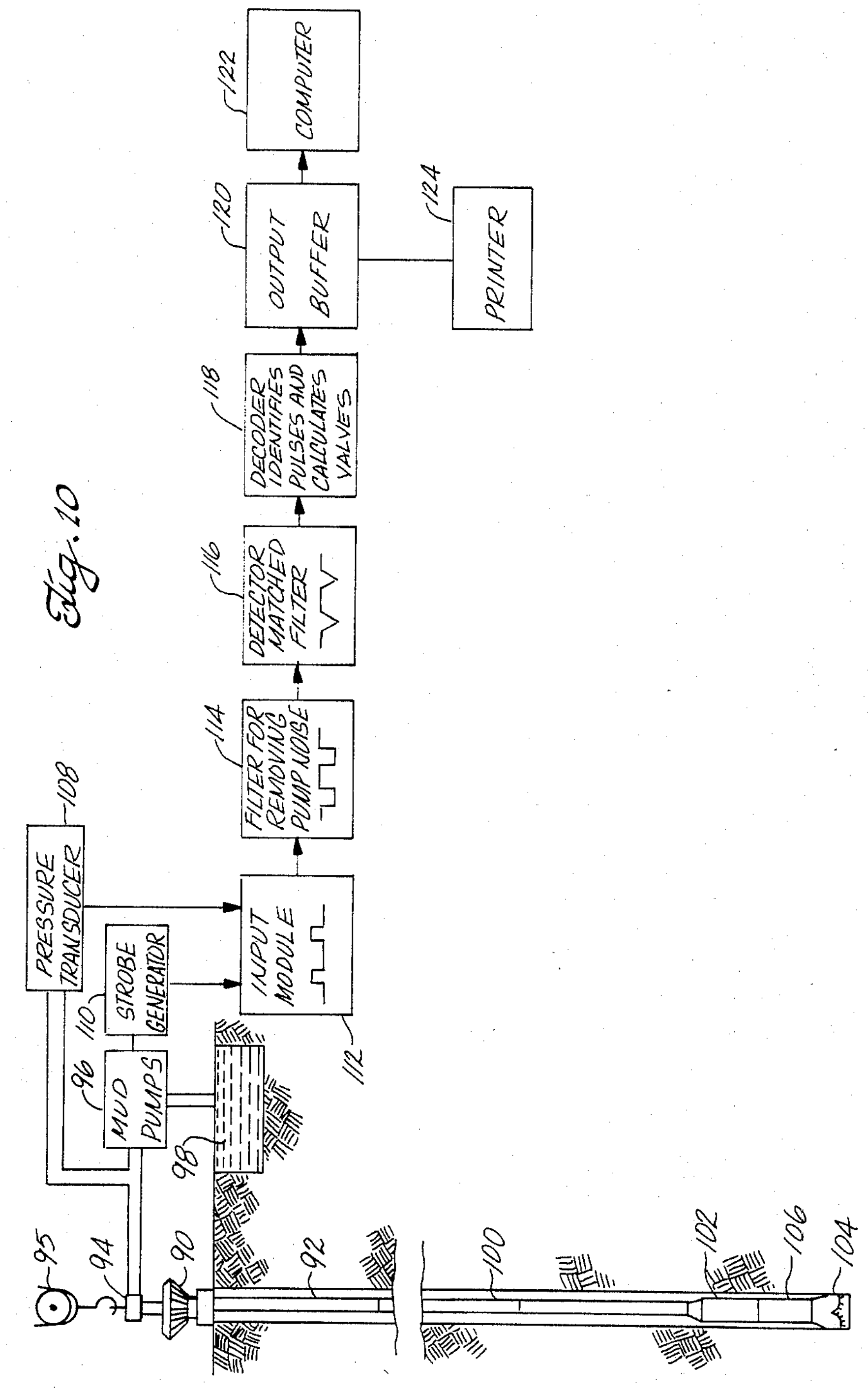
FIG. 10 illustrates how the pressure pulse signals may be processed at the surface to provide a read-out of the parameters that are measured down hole.

FIG. 10 illustrates one arrangement for processing the encoded data at the surface.

The drilling rig includes the usual rotary table 90, kelly 92, swivel 94, traveling block 95, mud pumps 96, mud pit 98, and a drill string made up of drill pipe sections 100 secured to the lower end of the kelly 92 and to the upper end of a drill collar 102 and terminating in the drill bit 104. The down hole pulse encoding apparatus and the valve 74 for producing negative pressure pulses may be located in a drill collar 106 located above the drill bit 104.

A pressure transducer 108 is coupled to the conduit for the drilling fluid and it senses the negative pressure pulses that are produced down hole.

The mud pumps 96 produce noise signals that have certain characteristics. A strobe generator 110 produces strobe signals for each cycle of each mud pump.

The signals from the pressure transducer 108 and the strobe generator 110 are applied to an input module 112 where the pressure signals are averaged in pairs and the average is stored 50 times per second in a buffer until required by the filter module 114.

The filter module 114 serves to remove or reduce the noise signals produced by the mud pumps 96. Various types of such filters are known in the art. However, the filter is preferably of the type shown in copending application Ser. No. 410,573.

The output of the filter 114 is applied to a detector 116 which employs a matched filter to enhance the detectability of the encoded pulses.

Figure 13:
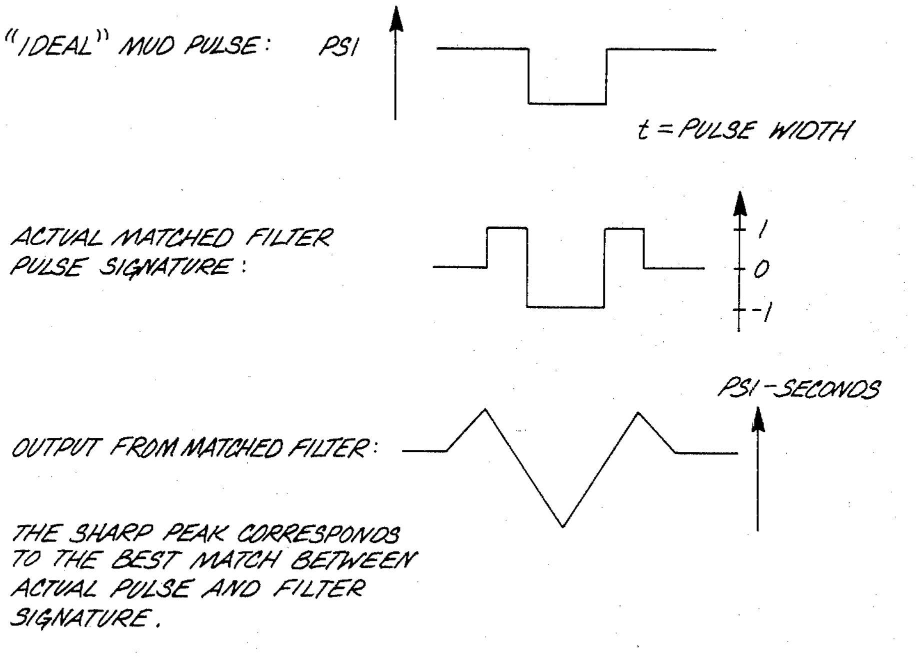
FIG. 13 are wave forms illustrating the operation of matched filter 116.

The pulse signature used in the matched filter is a first order approximation to a rectangular pulse which has been high-pass filtered at a frequency corresponding to 1(4*pulse width) hz. The use of a high-pass filter allows a simple level detector to be used for pulse identification, as illustrated in FIG. 13.

A high speed FFT convolution technique is used to implement the matched filter convolution. In operation, the convolution is performed approximately once every 20 seconds whenever data is made available by the filter module 114. The output of the matched filter is stored in a "Detection Buffer" which can hold data for more than one complete sub-frame. (Since the current sub-frame is 60 seconds long, the buffer is set up to hold data for a 64-second interval.)

A simple level detection scheme is performed on the (overlapping) 64-second intervals. (The detection level is a user-controlled parameter). Pulse position (time) is assigned at the pulse minimum; pulse height and width are also determined. The decoded pulses are stored in a "Pulse Table" for use by the decoder module 118. If pulse width does not fit within certain predefined limits, then the pulse is considered to be "noise" and discarded.

Sub-frame sync pulses are found by a search of invariant pulses of one-minute periods over the last three minutes. When these pulses are found, the detection buffer is shifted in time to ensure that the start of the sub-frame will be located at the start of the buffer. The time of the sync pulse is recorded for use by the decoder module 118.

Since three minutes are required for the identification of sync pulses, the first time a downhole Tool starts up downhole, a search for frame ident pulses is enabled within the detector module 116 before the sub-frame sync pulses are identified. This enables the apparatus to synchronize on the first sub-frame that is transmitted from downhole.

The output of the detector 116 is applied to a decoder 118 which identifies the pulses and calculates the values.

This module operates once every sub-frame. Every time the detection buffer is filled, the decoder module 118 uses the information within the Pulse Table set-up by the detector module 116 to identify pulse types.

Sync pulses are first identified by their position in time. Frame ident pulses are then searched for, again at predefined time positions. All pulses are allowed a small error in time setup as a user setpoint called "Pulse Position Variance" (typically 0.1 second). All remaining pulses are searched to identify the "groups of three equally spaced pulses" which identify data and redundant pulses.

Once the pulses are identified sub-frame numbers and data values can be calculated and supplied to the output buffer 120 via the Decoder Buffer.

The output buffer 120 transmits the data within the decoder 118 to a computer 122 or a printer 124 for setting forth the data parameters that are transmitted to the surface.

What is claimed is:

1. Apparatus for encoding data in a pulse telemetry system comprising means for producing a train of encoded data pulses wherein the time intervals between pairs of successive data pulses constitute measurements of the magnitude of the data parameters, and means for producing redundant pulses at known time locations with respect to and between pairs of the data pulses, for enabling the telemetry system to distinguish data pulses from noise signals because of the known time relationship between the redundant pulses and the encoded data pulses.

2. The apparatus of claim 1 in which each redundant pulse is produced at a time that is midway along the time between adjacent pairs of data pulses.

3. The apparatus of claim 1 in which each redundant pulse is produced between alternate pairs of data pulses.

4. The apparatus of claim 1 in which the redundant pulses are produced after every second data pulse.

5. The apparatus of claim 1 further including means for producing synchronizing pulses having a fixed time relationship with respect to the train of encoded data pulses.

6. The apparatus of claim 1 wherein the successive synchronizing pulses are spaced from one another by fixed time intervals.

7. Apparatus for producing encoded data in a pulse telemetry system comprising means for producing frames of pulse encoded data having a known number of synchronization intervals of equal time duration defined by synchronization pulses at the beginning of each synchronization interval, the pulse encoded data being arranged in data words which constitute measurements of the magnitude of the data parameters, means for producing redundant pulses in preselected data words having known time positions with respect to and between the pulses in the data words for enabling the apparatus to distinguish data pulses from noise, and means for producing at least one identification pattern of pulses at a known location in each frame, with the pulses in each identification pattern being spaced from one another by known intervals of time.

8. A method of well logging by telemetering information in pressure pulses in the drilling fluid from the interior of a well to the surface comprising producing encoded data pulses wherein the time intervals between pulses constitute measurements of the magnitude of data measured in the well, producing redundant pulses at known times with respect to and between the data pulses, and producing pressure pulses in the drilling fluid in accordance with the occurrence of the data pulses and the redundant pulses.

9. The method of claim 8 wherein each redundant pulse is produced between preselected pairs of data pulses in a known time relationship with respect to said pairs of data pulses.

10. The method of claim 8 further including producing synchronizing pulses which define synchronization intervals having a known time relationship with respect to the encoded data pulses.

11. The method of claim 10 further including counting and storing successive synchronization intervals while they are being produced, and wherein the production of the pressure pulses in the drilling fluid is delayed a known time for enabling the identification of the last stored synchronization interval when the well logging is shut down.

12. A method of well logging by producing encoded data representing data parameters measured in a well while drilling is being conducted comprising producing a series of synchronization pulses spaced from one another by a synchronization interval of known time duration, producing encoded data pulses during each synchronization interval wherein the time intervals between successive data pulses constitute measurements of the magnitude of the data parameters measured in the well, and producing redundant pulses having a known time relationship with respect to and between the data pulses to provide a pulse sequence having a unique time relationship for distinguishing data pulses from noise signals.

13. The method of claim 12 further including producing identificationn patterns of pulses in pre-selected synchronization intervals.

14. A method of well logging by producing encoded data representing data parameters measured in a well while drilling is being conducted, comprising producing a series of synchronization pulses wherein successive pulses are spaced from one another by a synchronization interval of known time duration, producing encoded data pulses constituting data words during each synchronization interval with the time intervals between successive pairs of data pulses constituting measurements of the magnitude of the data parameters, producing said data words in identified sub-frames of data in a known numerical sequence, sequentially grouping a number of sub-frames into frames, with each frame representing one complete set of data and with the location of each data word being at a known identifiable position in each frame, sequentially storing the sub-frame identifications, and applying the sub-frames of pulse data in sequence to a pulse generator for producing pressure pulses for transmission to the surface of the well after a known time delay, whereby when the well logging is shut down the last stored sub-frame identification remains in storage and identifies the sub-frame number at which the well logging is to restart.

15. The method of claim 14 wherein two data words are produced during each synchronization interval.

16. The method of claim 14 wherein at least three data words are produced during each synchronization interval.

17. The method of claim 14 further including producing redundant pulses in preselected data words in each sub-frame, with the redundant pulses having known time relationships with respect to the data pulses.

18. The method of claim 14 further including producing at least one identification pattern of pulses at a known location in each frame, with the pulses in each identification pattern being spaced from one another by known intervals of time.

19. A method of well logging by telemetering information in pressure pulses in the drilling fluid from the interior of a well to the surface comprising producing a series of synchronization pulses wherein successive pulses are spaced from one another by a synchronization interval of known time duration to define sub-frames of information, producing data words in known sequences during each synchronization interval in the form of data pulses wherein the time intervals between known pairs of pulses constitute measurements of the magnitude of data parameters measured in the well, with some preselected data words providing identification patterns of pulses with the pulses in each pattern being spaced from one another by known intervals of time, producing redundant pulses having known time relationships between selected data pulses for distinguishing data pulses from noise signals, sequentially combining a known number of sub-frames into frames, with each frame constituting one complete set of data, sequentially storing the sub-frame numbers and the time at which they are stored, and producing pressure pulses after a known time delay in accordance with the successive sub-frames of data pulses, so that the last stored sub-frame number remains in storage and identifies the sub-frame number at which the well logging method should restart after a shutdown.

* * * * *